(12) United States Patent
Avare

(10) Patent No.: US 11,537,952 B2
(45) Date of Patent: Dec. 27, 2022

(54) METHODS AND SYSTEMS FOR MONITORING DISTRIBUTED DATA-DRIVEN MODELS

(71) Applicant: AVICENNA.AI, Marseilles (FR)

(72) Inventor: Christophe Avare, Ceyreste (FR)

(73) Assignee: AVICENNA.AI, Marseilles (FR)

( * ) Notice: Subject to any disclaimer, the term of this patent is extended or adjusted under 35 U.S.C. 154(b) by 0 days.

(21) Appl. No.: 17/319,282

(22) Filed: May 13, 2021

(65) Prior Publication Data

US 2022/0358414 A1 Nov. 10, 2022

Related U.S. Application Data

(63) Continuation of application No. 17/242,532, filed on Apr. 28, 2021, now abandoned.

(51) Int. Cl.
*G06N 20/10* (2019.01)
*G06F 11/34* (2006.01)

(52) U.S. Cl.
CPC ......... *G06N 20/10* (2019.01); *G06F 11/3452* (2013.01)

(58) Field of Classification Search
CPC .............................. G06N 20/10; G06F 11/3452
See application file for complete search history.

(56) References Cited

U.S. PATENT DOCUMENTS

| | | | | |
|---|---|---|---|---|
| 2014/0019116 | A1* | 1/2014 | Lundberg | G06F 8/30 704/8 |
| 2015/0309984 | A1* | 10/2015 | Bradford | G06F 40/263 704/8 |
| 2018/0114115 | A1* | 4/2018 | Liang | G06N 3/04 |
| 2020/0327433 | A1* | 10/2020 | Geraci | G06N 20/00 |
| 2021/0272040 | A1* | 9/2021 | Johnson | G06Q 40/04 |

OTHER PUBLICATIONS

Dietterich, Thomas G. "Ensemble methods in machine learning." In International workshop on multiple classifier systems, pp. 1-15. Springer, Berlin, Heidelberg, 2000. (Year: 2000).*
Szegedi, Gábor, Péter Kiss, and Tomás Horváth. "Evolutionary Federated Learning on EEG-data." In ITAT, pp. 71-78. 2019. (Year: 2019).*

(Continued)

*Primary Examiner* — Casey R. Garner
(74) *Attorney, Agent, or Firm* — Buchanan Ingersoll & Rooney PC

(57) ABSTRACT

A system for monitoring a data-driven model, configured to perform a task in a plurality of sites, includes a plurality of variants of the data-driven model deployed in each site. Each variant is used in one of a plurality of states including a first state wherein the output data of the variant is included in computing a result of the task, and a second state wherein the output data of the variant is excluded from computing the result of the task. A supervision module in each site monitors the plurality of variants, computes the task result based on the output data generated by each variant being used in the first state, and changes, based on the output data generated by variants being used in the first state and in the second state, the use state of a variant from one state to another.

16 Claims, 2 Drawing Sheets

(56) References Cited

OTHER PUBLICATIONS

Zhu, Hangyu, Haoyu Zhang, and Yaochu Jin. "From federated learning to federated neural architecture search: a survey." Complex & Intelligent Systems 7, No. 2 (2021): 639-657. (Year: 2021).*
Malik, Gurshaant Singh, Lucian Petrica, Nachiket Kapre, and Michaela Blott. "DarwiNN: efficient distributed neuroevolution under communication constraints." In Proceedings of the 2020 Genetic and Evolutionary Computation Conference Companion, pp. 141-142. 2020. (Year: 2020).*
Tan, Liang, Lin Li, Yifeng Han, Dong Li, Kaixi Hu, Dong Zhou, and Peipei Wang. "An empirical study on ensemble learning of multimodal machine translation." In 2020 IEEE Sixth International Conference on Multimedia Big Data (BigMM), pp. 63-69. IEEE, 2020 (Year: 2020).*

* cited by examiner

METHODS AND SYSTEMS FOR MONITORING DISTRIBUTED DATA-DRIVEN MODELS

CROSS-REFERENCE TO RELATED APPLICATION

This application is a continuation of U.S. patent application Ser. No. 17/242,532 filed Apr. 28, 2021, the entire content of which is incorporated herein by reference.

FIELD OF THE INVENTION

The present invention relates generally to methods and systems for managing distributed data-driven models, and more particularly to performance monitoring of at least a data-driven model deployed in a plurality of sites.

BACKGROUND OF THE INVENTION

As used herein, the term "data-driven model" is meant broadly and not restrictively, to include any function, application, algorithm, routine, or a combination thereof configured to operate on input data to generate output data based on an analysis of input data and not on an explicit knowledge of a relationship between input and output data. Examples of such data-driven models are statistical models, machine learning models, or ensemble models.

A general goal of a data-driven model is to discover patterns or regularities in training data which can be generalized over unseen data. During a validation phase, a previously unseen data set assumed to be representative of data at deployment time is used to test the performance (mainly, accuracy) of the deduced model. The obtained performances on the test data set are considered to reflect the data-driven model performance at deployment time.

However, such assumptions usually do not hold in real world deployment scenarios, especially if the data-driven model is deployed in a plurality of sites. Regularities or statistic features may, over time, evolve in each site and be differently biased from one site to another. In fact, changeable over time site-specific unforeseen objects, hidden factors, characteristics or external noise may emerge in the data. It results in degradation of the performance or, more generally, a performance drift of the data-driven model variously from one deployment site to another or between versions of the model at the same site.

Therefore, a continuous monitoring of an ensemble of distributed data-driven models is required to simultaneously or individually maintain their performance. Incremental updates, calibrations or fine tuning of these models in-situ is required periodically or whenever a performance drift is noticed.

Indeed, most of the focus in data-driven models management is about the control of the model performance drift because of the inevitable changes in data and deployed models with time. It is a known fact that the statistical nature of such models leads to different performance in a real world deployment because the data seen at deployment time, specifically when performed at different sites, are statistically different from the one used during the model creation.

In this regard, an online training or, when more than one location contributes to the final model, a federated learning may be adopted to re-train in-situ data-driven models, with the expectation that it will perform better.

Nevertheless, continuous monitoring of an ensemble of distributed data-driven models is challenging in more than one respect.

A first problem may arise with regards to privacy and sensitive information concerns while sharing training data. For instance, a federated learning based on distributed clinical, financial or consumption data set may not be privacy preserving. In practice, contract/license terms are usually provided to prohibit data storage or transfer outside the deployment site.

A second problem may concern the computational power of devices running data-driven models which may be low-powered or of limited computational or network resources such as an IoT device, a user terminal, or an edge node unable to perform computationally expensive tasks or to store large data sets that may be required for online training.

A third problem is that an incremental fine tuning of a data-driven model generally leads to an accumulation of patches that makes it more and more complicated and cumbersome. As a result, the efficiency with which the data-driven model operates may be adversely impacted. Because of constant maintenance and tuning to support various performance drift, models become overly complex (to maintain and evolve).

As a fourth problem and despite a continuous fine tuning, the performance of a data-driven model will ultimately, sooner or later, reach a plateau (a substantially fixed level) without any significant progress or gain in performance. This requires a paradigm change (e.g. model network topology, data pre- or post-processing, model family change), probably canceling all the previous gains (for example, online training without access to historical data used for the fine-tuning or impossibility to transfer the learned weights to the new model architecture). The need to train the new paradigm without the benefit of the prior data likewise diminishes the efficiency, and accuracy, of the system during its startup.

Furthermore, monitoring complex data-driven models is time is and effort consuming as human validation is usually required.

SUMMARY

Various embodiments are directed to addressing the effects of one or more of the problems set forth above. The following presents a simplified summary of embodiments in order to provide a basic understanding of some aspects of the various embodiments. This summary is not an exhaustive overview of these various embodiments. It is not intended to identify key or critical elements or to delineate the scope of these various embodiments. Its principal purpose is to present some concepts in a simplified form as a prelude to the more detailed description that is discussed later.

Some embodiments overcome one or more drawbacks of the prior art, by providing strategies for distributed data-driven model monitoring.

Some embodiments provide long-term deployment of up-to-date data-driven models.

Some embodiments ensure performance of an ensemble of distributed models across their lifecycle.

Various embodiments relate to a system for continuous monitoring of a data-driven model configured to perform a predefined task in a plurality of sites by generating, in each site of said plurality of sites, output data based on site-specific input data, said system comprising:
at least one processing device in each site that is configured to implement:

a plurality of variants of the data-driven model deployed in a respective site of said plurality of sites, each variant of said plurality of variants being used in one of a plurality of states including a first state wherein the output data of said each variant is included in computing a result of the task and a second state wherein the output data of said each variant is excluded from computing the result of the task;

a supervision module in a respective site of said plurality of sites for monitoring said plurality of variants deployed in said respective site, the supervision module being configured to compute the task result based on the output data generated by each variant of said plurality of variants being used in the first state;

to change, based on the output data generated by each variant of said plurality of variants being used in the first state and by each variant of said plurality of variants being used in the second state, the use state of a variant of said plurality of variants from one state to another of said plurality of states.

In accordance with a broad aspect, the supervision module is further configured to track performance of each variant of said plurality of variants being used in the first state and performance of each variant of said plurality of variants being used in the second state.

In accordance with another broad aspect, the supervision module is further configured to use historical performance over a predefined sliding window of each variant of said plurality of variants being used in the first state to compute the task result.

In accordance with another broad aspect, the supervision module is further configured to apply a predefined rule on historical performance over a predefined sliding window of each variant of said plurality of variants being used in the first state and of each variant of said plurality of variants being used in the second state to determine a state change of a variant of said plurality of variants.

In accordance with another broad aspect, the supervision module is further configured to change the use state of a variant of said plurality of variants from one state to another of said plurality of states in response to a remote request.

In accordance with another broad aspect, the task result is computed by majority vote between the output data generated by each variant of said plurality of variants being used in the first state.

In accordance with another broad aspect, the task result is a weighted average of the output data generated by each variant of said plurality of variants being used in the first state.

In accordance with another broad aspect, the same variant of the data-driven model is deployed in each site of said plurality of sites.

In accordance with another broad aspect, the plurality of variants includes a machine learning model, and/or a statistical model and/or an ensemble model.

In accordance with another broad aspect, the predefined task is a classification task or a prediction task or a regression task of a future value of at least a variable of interest.

In accordance with another broad aspect, the system further includes a remote server configured to collect from said supervision module information relating to said plurality of variants monitored by this supervision module.

In accordance with another broad aspect, the collected information includes historical performance of a variant of said plurality of variants being used in the first state and of a variant of said plurality of variants being used in the second state, a use state of a variant of said plurality of variants, or sample of input data based on which a variant of said plurality of variants generated an output data.

In accordance with another broad aspect, the remote server is configured to remotely change the use state of a variant of said plurality of variants from one state to another of said plurality of states.

In accordance with another broad aspect, the remote server is configured to add a variant to said plurality of variants deployed in a site of said plurality of sites.

In accordance with another broad aspect, the remote server is configured to compare a first historical performance collected from a first supervision module in a first site of said plurality of sites to a second historical performance collected from a second supervision module in a second site of said plurality of sites.

In accordance with another broad aspect, the supervision module is configured to compute a task result using a computation method provided by the remote server.

In accordance with another broad aspect, the remote server is configured to communicate an update information to a first supervision module in a first site of said plurality of sites based on collected information from a second supervision module in a second site of said plurality of sites, the update information including tuning information of a variant or a state change of a variant.

Various embodiments further relate to a method for continuous monitoring of a data-driven model configured to perform a predefined task in a plurality of sites by generating, in each site of said plurality of sites, output data based on site-specific input data, the method includes:

deployment of a plurality of variants of the data-driven model in each site of said plurality of sites, each variant of said plurality of variants being intended to be used in one of a plurality of states including a first state wherein the output data of said each variant is included in computing a result of the task and a second state wherein the output data of said each variant is excluded from computing the result of the task;

monitoring said plurality of variants deployed in said each site, including computing the task result based on the output data generated by each variant of said plurality of variants being used in the first state;

changing, based on the output data generated by each variant of said plurality of variants being used in the first state and by each variant of said plurality of variants being used in the second state, the use state of a variant of said plurality of variants from one state to another of said plurality of states.

In accordance with a broad aspect, the method further includes tracking performance of each variant of said plurality of variants being used in the first state and each variant of said plurality of variants being used in the second state.

In accordance with another broad aspect, the method further includes remote updating of a first variant deployed in a first site of said plurality of sites based on tracked performance of a second variant deployed in a second site of said plurality of sites.

While the various embodiments are susceptible to various modification and alternative forms, specific embodiments thereof have been shown by way of example in the drawings. It should be understood, however, that the description herein of specific embodiments is not intended to limit the various embodiments to the particular forms disclosed.

It may of course be appreciated that in the development of any such actual embodiments, implementation-specific decisions should be made to achieve the developer's specific goal, such as compliance with system-related and business-related constraints. It will be appreciated that such a development effort might be time consuming but may nevertheless be a routine understanding for those or ordinary skill in the art having the benefit of this disclosure.

DESCRIPTION OF THE DRAWINGS

The objects, advantages and other features of the present invention will become more apparent from the following disclosure and claims. The following non-restrictive description of preferred embodiments is given for the purpose of exemplification only with reference to the accompanying drawings in which FIG. 1 schematically illustrates components of a system to continuously monitor a data-driven model deployed in a plurality of sites according to various embodiments;

DETAILED DESCRIPTION OF ILLUSTRATIVE EMBODIMENTS

Figure 1:
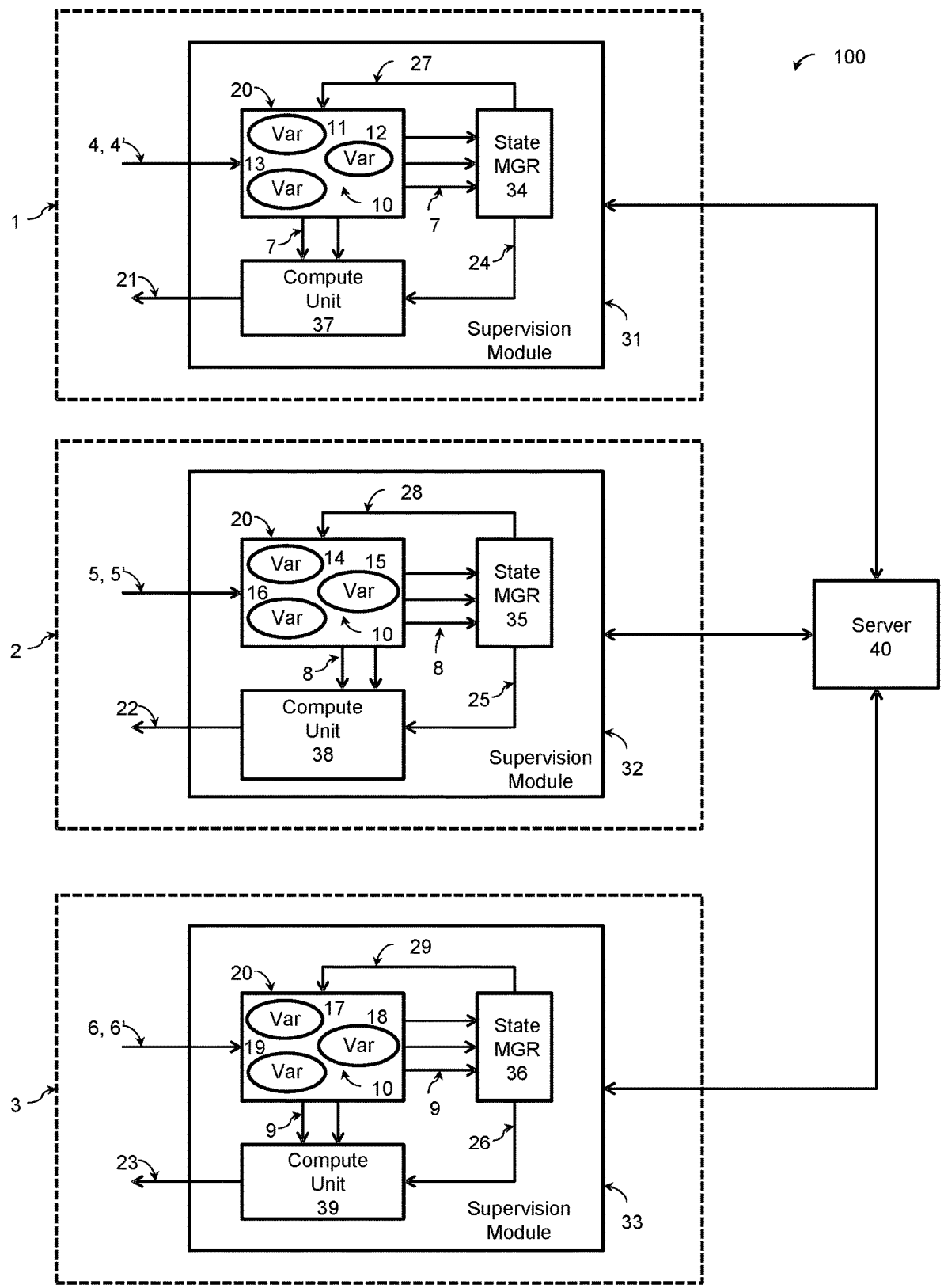

With reference to FIG. 1, there is shown components of a system 100 for continuous monitoring of a data-driven model 10 deployed in a plurality of sites 1-3. This data-driven model 10 is configured to perform a predefined task 20 based on site-specific or local input data 4-6.

This task 20 is, for instance, a classification task, a recognition task, a decision-support task, a speech-to-text conversion task, or a prediction task of a future value of a variable of interest. Examples of the deployment sites 1-3 are medical institutions implementing a data-driven model 10 for computer assisted diagnosis, video surveillance systems implementing a data-driven model for person detection, robots or self-driving cars implementing a data-driven model 10 for pedestrian detection, servers implementing a data-driven model for network attack detection, software applications implementing a data-driven model for speech-to-text conversion, financial markets implementing a data-driven model for stock price prediction, or the like.

Input data 4-6 are site-specifically biased. In other words, input data 4-6 may be differently biased from one site 1-3 to another. Input data biases may be introduced by site-specific hidden factors or any implicit features of subjects to which input data 4-6 relate such as gender, age, race, ethnicity, corpulence (when input data 4-6 relate to a population in a deployment location), substitute products or geopolitical situation (when input data 4-6 relate to the price of a product), or measurement methods of input data 4-6.

In order to take into account these input data biases, pluralities of variants 11-19 of the data-driven model 10 are deployed in the sites 1-3. By "variants 11-19 of the data-driven model 10" is meant
versions, revision or editions of the data-driven model 10;
alternative or equivalent embodiments/implementations of the data-driven model 10;
differently tuned copies of the data-driven model 10; or
any combination thereof, which are
able to perform the same task 20 by generating output data 7-9 based on input data 4-6. More generally, each one of the variants 11-19 of the data-driven model 10 is able to perform the task 20.

These distributed pluralities of variants 11-19 over sites 1-3 may include common or separate variants 11-19. In one embodiment, at least the same variant 11-19 of the data-driven model 10 is deployed in each of the sites 1-3.

On-site variants 11-19 are intended to perform the same task 20 based on local input data 4-6 at each deployment site 1-3. In particular, no limitation on how a variant 11-19 of the data-driven model 10 is designed (for example, supervised or not, parametric or not, linear or not, pre-trained or randomly initialized, customized or not) is imposed beyond its ability to be integrated in the system 100.

The pluralities of variants 11-19 of the data-driven model 10 may include
machine learning models such as convolutional neural networks (CNN), recurrent neural networks (RNN), artificial neural networks (ANN), deep neural networks (DNN), support vector machines (SVM), relevance vector machines (RVM), tree-based models (e.g., decision tree, random forest models), K-nearest neighbors model (KNN);
statistical models such as linear regression models, logistic regression models, cluster analysis models, time series models (e.g. autoregressive models, autoregressive integrated moving average models), Naive Bayes models, probability distribution model (e.g., Weibull, normal, lognormal and extreme value distributions), Bayesian methods (e.g., Bayesian inference models, Markov Chain Monte Carlo models), stochastic process models (e.g., Markov process models, Gaussian process models, Gamma process models); and/or
ensemble models combining a plurality of learning models.

In one embodiment, the different variants 11-19 of the data-driven model 10 can be adapted to cope with differently biased input data 4-6 while preserving performance.

Each variant 11-19 of the data-driven model 10 is intended to be used in one of a plurality of states (mode or stage of its lifecycle) including
an online state (i.e. active or functioning state) wherein it receives input data 4-6 and its output data 7-9 are included in computing the task result 21-23, i.e. it contributes to the final decision (like a first-team player). Its output data 7-9 are taken into account in the calculation of the task result 21-23;
a quarantined state (i.e. under review or available as replacement state) wherein it receives, like in the online state, input data 4-6, but its output data 7-9 are excluded from computing the task result, i.e. it does not contribute to the final decision (like a substitute player). Its output data 7-9 are not taken into account in the calculation of the task result 21-23.

Accordingly, each time a given task 20 in a given site 1-3 receives input data 4-6, the set of online and quarantined variants 11-19 are launched and generate their respective output data 7-9.

A variant 11-19 of the data-driven model 10 may be further intended to be used
in an archived state wherein it neither receives input data 4-6 nor generates output data 7-9; or
in a retired state wherein it is scheduled for removal from the site 1-3 (for example, after a legal retention period).

For instance, the system 100 may include for a binary (Yes/No) classification task 20, a same plurality of variants 11-19 of a binary classification data-driven model 10 deployed in each of the sites 1-3 and including a first version of a first convolutional neural network (CNN1_v1) which has been used in the online state for one year;

a second version of the first convolutional neural network (CNN1_v2 which is an evolution of CNN1_v1) which has been used in quarantined state for one month;

a first version of a first Random Forest model which has been used in the online state for six months;

a first version of a second convolutional neural network coupled with a first version of a first decision tree (CNN2_v1+DT_v1), which have been used in the online state for three months.

A supervision module 31-33 in each of the sites 1-3 is configured to continuously locally monitor the plurality of variants 11-19 of the data-driven model 10 deployed therein. The supervision module 31-33 is configured to dynamically manage the states of the variants 11-19 of the data-driven model 10 and to accurately compute a task result 21-23 based on output data 7-9 so that predefined performance objectives are met.

To that end, the supervision module 31-33 includes a computing unit 37-39 configured to combine the individual output data 7-9 of each variant 11-19 being used in the online state to compute a task result 21-23. In other words, the computing unit 37-39 is configured to compute, based on output data 7-9 generated by variants 11-19 being used in the online state, the task result 21-23.

In one embodiment, the task result 21-23 is computed at each site 1-3 by majority vote between the output data 7-9 of variants 11-19 being used in the online state. In another embodiment, the task result 21-23 is a weighted average of output data 7-9 of variants 11-19 being used in the online state. In another embodiment, the task result 21-23 computation is based on a bayesian algorithm, a multi-armed bandit algorithm, heuristics, or any other logic model framework applied to the individual output data 7-9 of variants 11-19 being used in the online state.

As an illustrative example, consider the individual output data 7-9 of three variants 11-19 of a binary (yes/no) classification data-driven model 10 being used in the online state for two independent input data 4-6 (i.e. two task runs) as follows:

in a first task run, the output data 7 of the first, second and third variants 11-13 are, respectively, "Yes", "Yes", "No". In this case, a task result 21 based on a majority vote is "Yes";

in a second task run, the output data 7 of the first, second and third variants 11-13 are, respectively, "Yes", "No", "No". In this case, a task result 21 based on a majority vote is "No".

More generally, the task result 21-23 in each site 1-3 is based on a combination of output data 7-9 generated by variants 11-19 being used in the online state in this site 1-3. Advantageously, a plurality of variants 11-19 with potentially different biases perform collectively better than individually for task result 21-23 prediction.

The supervision module 31-33 further includes a state manager 34-36 able to change (via links 27-29 in FIG. 1), the state of a variant 11-19 of the data-driven model 10 from one use state to another, based on generated output data 7-9 by variants 11-19 being used in the online state and by variants 11-19 being used in the quarantined state. In this regard, the state manager 34-36 collects the individual output data 7-9 of variants being used in the online state, and output data 7-9 of variants being used in quarantined state. Based on collected output data 7-9, the state manager 34-36 decides which variant 11-19 can contribute or not to the computation of the task result 21-23 and changes (links 27-29) its state accordingly.

More generally, the state manager 34-36 is configured to track performance of the variants 11-19 being used in the online state and the variants 11-19 being used in quarantined state. In one embodiment, the state manager 34-36 is provided with predefined rules (or policies) to be applied on historical performance (performance track record) over a predefined sliding window to determine state changes of variants 11-19 being used in the online state or in quarantined state.

By changing the state of one or more variants 11-19, those contributing to the task result 21-23 may be modified so that task performance is improved. Based on predefined rules, the state manager 34-36 detects performance improvement or degradation and changes (via links 27-29) the states of deployed variants 11-19 of the data-driven model 10 accordingly. These rules are for instance:

change the use state of a variant 11-19 from "online" to "quarantined" or from "quarantined" to "archived" when its performance according to a first metric falls below a predefined threshold;

change the use state of a variant 11-19 from "quarantined" to "online" when its performance according to a second metric is above a predefined threshold after some duration (a predefined sliding window or number of runs for example).

In one embodiment, the first metric and/or the second metric are a predefined statistical value (such as, an average, a maximum, a minimum, a median, or a standard deviation)

of output data 7-9 generated by the variant 11-19 over a predefined duration such as a sliding window like a weekly, a monthly or a quarterly moving average; or of a predefined number of output data 7-9 (number of task runs) generated by the variant 11-19 such as the fifty, or the hundred most recent output data 7-9.

As an illustration, consider the following example wherein an assessment of the variants states is made every one hundred task runs:

the performance of a first variant 11-19 currently being used in the online state are on average 92% over the three hundred previous task runs, 90% over the two hundred previous task runs, and 91% over the most recent one hundred runs;

the performance of a second variant currently being used in quarantined state are on average 92% over the three hundred previous task runs, 91% over the two hundred previous task runs, and 92% over the most recent one hundred runs;

the performance of a third variant currently being used in the online state are on average 91% over the three hundred previous task runs, 89% over the two hundred previous task runs, and 91% over the most recent one hundred runs;

the performance of a fourth variant currently being used in the online state are on average 91% over the three hundred previous task runs, 85% over the two hundred previous task runs, and 87% over the most recent one hundred runs.

In this example, the following decisions may be taken by the state manager 34-36 the first and the third variants are kept in the online state because their accuracy did not degrade significantly;

the second variant is brought online because, after its observation period, its accuracy is constantly on par or better than previous version, confirming its robustness;

the fourth variant started to experience a significant accuracy decrease and is quarantined, thus preventing contribution to the results, while still being observed in case its performance comes up again. Some insight about the sudden change for the fourth variant may be reported with the help of users with access to the data over that period. In this case, an alert may be raised by the supervision module 31-33.

The collection of individual output data 7-9 of variants 11-19 being used in the online state and in quarantined state advantageously allows the supervision module 31-33 to continuously have its own evaluation metrics (e.g. Area Under the Curve of Receiver Characteristic Operator which can be evaluated is over time and introduced into a decision strategy) for checking the performance of these variants 11-19.

Also, based on collected individual output data 7-9 of variants being used in the online state and of variants being used in quarantined state, the state manager 34-36 may decide on how a variant 11-19 being used in the online mode contributes (weights) in the computation of the task result 21-23.

For example, an average performance (i.e. accuracy) over a predefined sliding window or over a predefined number of most recent task runs may be used as weights for computing a weighted average of output data 7-9 by the computing unit 37-39. Accordingly, a performance track record 24-26 of variants 11-19 being used in the online state is provided by the state manager 34-36 to the computing unit 37-39 to compute the task result 21-23.

Based on historical performance of variants 11-19 of the data-driven model 10 over a predefined sliding window, the state manager 34-36 and the computing unit 37-39 contribute, advantageously, to a continuous local monitoring of the plurality of variants 11-19 at each deployment site 1-3. In fact, a sliding window of historical performance including a batch of recent task runs may be used by the state manager 34-36 to assess the current output data 7-9 performance and to select the most relevant ones to contribute, possibly with different weights, to the task result 21-23 by changing their state to online state. The performance track record 24-26 over a predefined sliding window of variants 11-19 being used in the online state can then be used by the computing unit 37-39 to compute the task result 21-23.

In one embodiment, the state manager 34-36 changes the state of a variant 11-19 in response to a remote request (such as archiving, retiring, change to online or to quarantined state of a certain variant 11-19 of the data-driven model 10).

Advantageously, the dynamic addition of new variants and the step-by-step upgrade or retirement of existing ones by changing their use states (e.g. an observation period in quarantined state before an upgrade to online state or before a downgrade to archived state) allow efficient and smooth change without loss of previous results and to maintain long term performance.

In one embodiment, a Multi Decision Criteria Analysis (MDCA) and/or Operations Research (OR) scheme is used for producing, from the collected individual output data 7-9 by the state manager 34-36, optimal rules and performance track record 24-26, respectively, for the state manager 34-36 and for the computing unit 37-39.

In order to further improve the task 20 performance and continuously evolve together the pluralities of variants 11-19 of the data-driven model 10, a remote server 40 is configured to monitor the on-site supervision modules 31-33. This remote server 40 is, in one embodiment, external to local networks of supervision modules 31-33.

The remote server 40 is configured to collect from the supervision modules 31-33 performance track record (i.e. historical performance) relating to the pluralities of variants 11-19. The rules of the state manager 34-36, the task result 21-23 computing method, and/or information about deployed variants 11-19 may also be provided by the supervision module 31-33 to the remote server 40. The supervision module 31-33 coordinates the data workflow and communication between the state manager 34-36, the computing unit 37-39, and the remote server 40. In another embodiment, samples of input data 4-6 leading to unexpected performance degradation of a variant 11-19 are communicated to the remote server 40 for analysis.

The remote server 40 is further able to send data to a specific supervision module 31-33. This data may relate to any dynamic aspect of the supervision module 31-33. This data may include a rule to be applied by the state manager 34-36, a computation method to be applied by the computing unit 37-39, a sliding window size for the collection of output data 7-9 generated by the pluralities of variants 11-19 (a sliding window size per variant or the same sliding window size for all the variants), the state of a given variant 11-19, or a new variant 11-19 of the data-driven model 10.

Advantageously, the remote server 40 has access to additional data and knowledge outside the domain of each supervision module 31-33. It results in that the remote server 40 having a consolidated view of deployed supervision modules 31-33 allowing it to use fine-tuned decision methods.

Each supervision module 31-33 may receive instructions from the remote server 40 to change the state of a given variant 11-19 or update its policies and heuristics. For example, the remote server 40 can decide to put a given variant 11-19 into quarantine state in a first site 1-3 because it performs badly at a second site 1-3, thus anticipating similar problems at sites which are not immediately experiencing the same problem. Accordingly, the remote server 40 can perform predictive maintenance of variants 11-19 of the data-driven model 10. More generally, the remote server 40 may communicate update information (tuning information, state change, computation method of the task result, rules to state change for example) to a supervision module 31-33 based on collected information, namely historical performance, collected from another supervision module 31-33.

Updates on a site-by-site basis may therefore be scheduled by the remote server 40. The remote server 40 provides the ability to predictably determine, in which site 1-3, when and how to update the deployed plurality of variants 11-19 of the data-driven model 10. It results in a proactive maintenance and continuous improvement of data-driven model 10 with various variants 11-19 differently sensitive to input data biases (instead of an incremental single variant which progress in a systematic and equivalent way on all these biases).

More generally, the remote server 40 is configured to assess obtained performances by the variants 11-19 being used in the online state and quarantined state in all the sites 1-3, to detect any performance drift in any one of the deployment sites 1-3, and provide appropriate updates accordingly. The remote server 40 tracks performance drift among sites 1-3 (notably, under-fitting or over-fitting problem in one site with respect to the others) and anticipates such drift for others. As soon as a variant 11-19 experiences a performance drift higher than a predefined threshold, the remote server 40 amends deployed variants 11-19 in this site and anticipates such an update on the others sites 1-3.

Accordingly, the remote server 40 is capable of:
collecting historical performance from all the on-site supervision module 31-33,
performing analysis/meta-analysis on collected data;
generating and propagating new updates to be applied to one or more supervision modules 31-33. These updates may include new, revised or fine-tuned variants 11-19 of the data-driven model 10, new rules to be applied by state managers 31-33 or any other configurable parameter of the supervision modules 31-33.

Moreover, the remote server 40 allows extracting abnormal cases for analysis, to submit a new variant of the data-driven model 10 for validation, to retrieve data on the basis of which the state of a variant 11-19 was modified, or to develop benchmarking variants 11-19 which can be made available later. To validate a new candidate variant, it may be deployed in a selected site 1-3 in the quarantined state and corresponding output data 7-9 may be directly provided to the remote server 40 for comparison to the other variants' performance.

Advantageously, the remote server 40 has access to all supervision modules 31-33 information and thus has a global vision consolidating a collective intelligence for a sustainable improvement.

An external decision process (e.g. human experts) may control the performance of the remote server 40, and any number of supervision modules 31-33 consolidated in this remote server 40. The remote server 40 may be provided with new performance assessment rules or strategies.

In one embodiment, previously validated sets of input data 4'-6' (i.e. whose corresponding data output 7-9 are known in advance) are regularly used instead of input data 4-6 to compare and monitor performance of deployed variants 11-19 in the different sites 1-3. The individual output data 7-9 of variants 11-19 based on the previously validated sets of input data 4'-6' are collected by the remote server 40 for a global prospective performance evaluation. Advantageously, locally performing the same task 20 in different sites 1-3 based on a same predefined set of input data 4'-6' allows the system 100 to automatically track performance of distributed variants 11-19 of the data-driven model 10 and thus to assess its own performance.

In one embodiment, the supervision module 31-33 is configured to monitor a plurality of tasks (i.e. different set of variants 11-19 performing different tasks) deployed in sites 1-3.

In another embodiment, the above described embodiments are supported by a BAM (Business Activity Monitoring) solution for analyzing, collecting, and presenting data in an extended enterprise.

Figure 2:
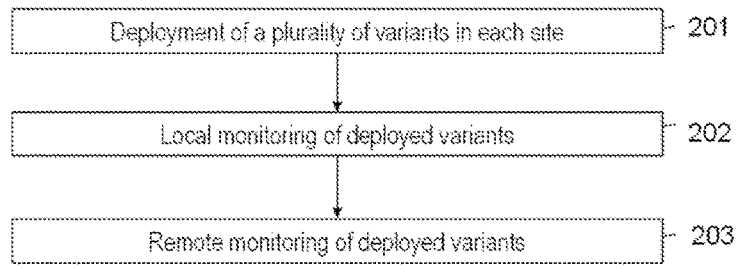
FIG. 2 schematically illustrates process steps of a method for continuous monitoring a data-driven model deployed in a plurality of sites according to various embodiments.

With reference to FIG. 2, there are shown process steps of a method 200 for continuous monitoring of a data-driven model 10 deployed in a plurality of sites 1-3.

This method 200 includes a deployment step 201 of a plurality of variants 11-19 of the data-driven model 10 in each site 1-3. Each variant 11-19 is intended to be used in one of a plurality of states as described above (online, quarantined, archived, or retired for example).

During a local monitoring step 202 and when receiving local input data 4-6, a task result 21-23 in each site 1-3 is computed by the computing unit 37-39 based on output data 7-9 generated by variants 11-19 being used in the online state. As described above, this local monitoring step 202 further includes changing the state of a variant 11-19 from one state to another based on local output data 7-9 generated by variants 11-19 being used in the online state and quarantined state. This local monitoring step 202 further includes tracking performance of variants 11-19 being used in the online state and in quarantined state. The collected historical performance by each one of the supervision module 31-33 are separately communicated to the remote server 40.

During a remote monitoring step 203, the historical performance collected by the remote server 40 from the entire on-site supervision module 31-33 are analyzed and, if necessary, appropriate updates are propagated to concerned supervision modules 31-33. These updates may include new, revised or fine-tuned variants 11-19 of the data-driven model 10, new rules to be applied by state managers 31-33 or any other configurable parameter of the supervision modules 31-33. Accordingly, a remote update of a variant 11-19 deployed in a certain site 1-3 may be applied based on tracked and collected historical performance from another site 1-3.

Figure 3:
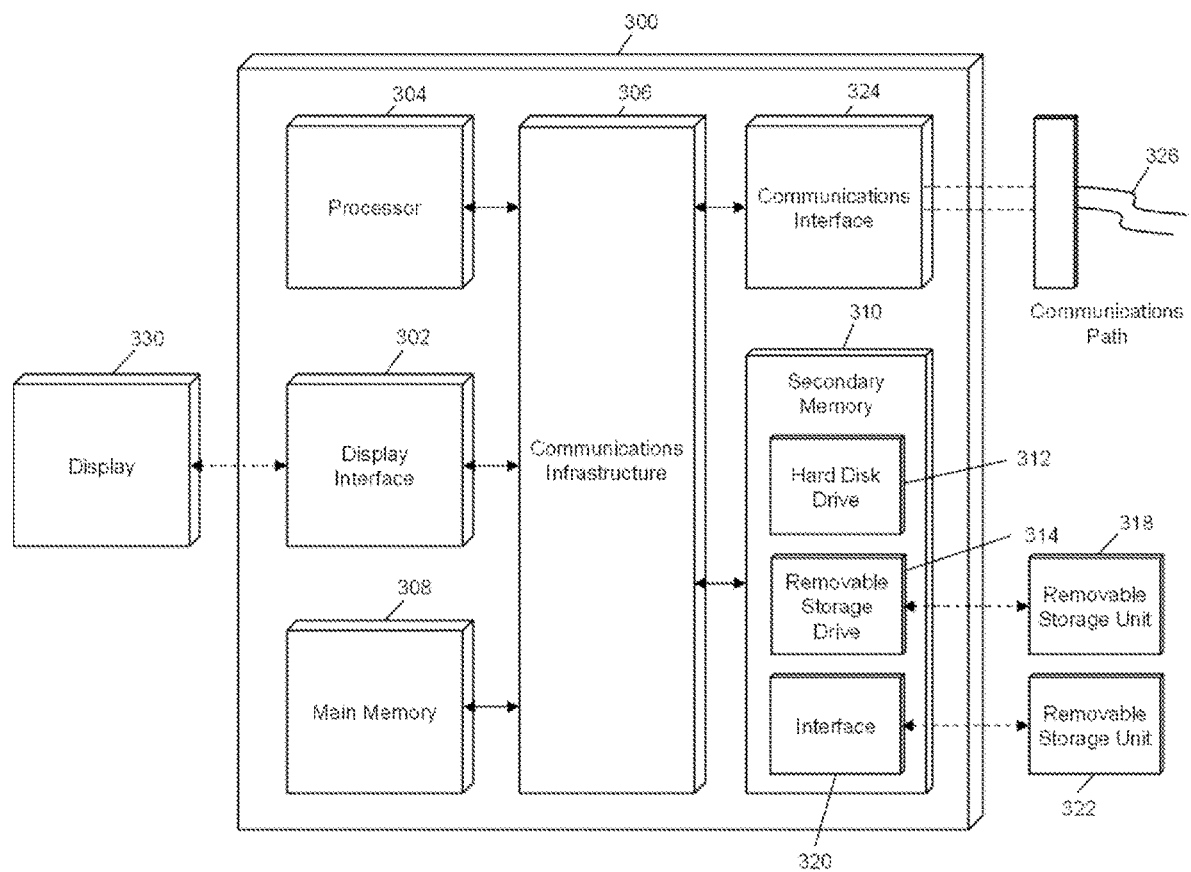
FIG. 3 schematically illustrates elements of a computing device according to various embodiments.

FIG. 3 illustrates a computer system 300 in which embodiments of the present disclosure, or portions thereof, may be implemented as computer-readable code. For example, one or more (e.g., each) of the supervision module 31-33, computing unit 37-39, state manager 34-36, remote server 40, and other device described herein may be implemented in the computer system 300 using hardware, software, firmware, non-transitory computer readable media having instructions stored thereon, or a combination thereof and may be implemented in one or more computer systems or other processing systems. Hardware, software, or any combination thereof may embody modules and components used to implement the method of FIG. 2.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above-described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 318, a removable storage unit 322, and a hard disk installed in hard disk drive 312.

Various embodiments of the present disclosure are described in terms of this example computer system 300. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 304 may be a special purpose or a general purpose processor device specifically configured to perform the functions discussed herein. The processor device 304 may be connected to a communications infrastructure 306, such as a bus, message queue, network, multi-core message-passing scheme, etc. The network may be any network suitable for performing the functions as disclosed herein and may include a local area network (LAN), a wide area network (WAN), a wireless network (e.g., Wi-Fi), a mobile communication network, a satellite network, the Internet, fiber optic, coaxial cable, infrared, radio frequency (RF), or any combination thereof. Other suitable network types and configurations will be apparent to persons having skill in the relevant art. The computer system 300 may also include a main memory 308 (e.g., random access memory, read-only memory, etc.), and may also include a secondary memory 310. The secondary memory 310 may include the hard disk drive 312 and a removable storage drive 314, such as a floppy disk drive, a magnetic tape drive, an optical disk drive, a flash memory, etc.

The removable storage drive 314 may read from and/or write to the removable storage unit 318 in a well-known manner. The removable storage unit 318 may include a removable storage media that may be read by and written to by the removable storage drive 314. For example, if the removable storage drive 314 is a floppy disk drive or universal serial bus port, the removable storage unit 318 may be a floppy disk or portable flash drive, respectively. In one embodiment, the removable storage unit 318 may be non-transitory computer readable recording media.

In some embodiments, the secondary memory 310 may include alternative means for allowing computer programs or other instructions to be loaded into the computer system 300, for example, the removable storage unit 322 and an interface 320. Examples of such means may include a program cartridge and cartridge interface (e.g., as found in video game systems), a removable memory chip (e.g., EEPROM, PROM, etc.) and associated socket, and other removable storage units 322 and interfaces 320 as will be apparent to persons having skill in the relevant art.

Data stored in the computer system 300 (e.g., in the main memory 308 and/or the secondary memory 310) may be stored on any type of suitable computer readable media, such as optical storage (e.g., a compact disc, digital versatile disc, Blu-ray disc, etc.), magnetic tape storage (e.g., a hard disk drive), or solid-state memory. The data may be configured in any type of suitable database configuration, such as a relational database, a structured query language (SQL) database, a distributed database, an object database, etc. Suitable configurations and storage types will be apparent to persons having skill in the relevant art.

The computer system 300 may also include a communications interface 324. The communications interface 324 may be configured to allow software and data to be transferred between the computer system 300 and external devices. Exemplary communications interfaces 324 may include a modem, a network interface (e.g., an Ethernet card), a communications port, a PCMCIA slot and card, etc. Software and data transferred via the communications interface 324 may be in the form of signals, which may be electronic, electromagnetic, optical, or other signals as will be apparent to persons having skill in the relevant art. The signals may travel via a communications path 326, which may be configured to carry the signals and may be implemented using wire, cable, fiber optics, a phone line, a cellular phone link, a radio frequency link, etc.

The computer system 300 may further include a display interface 402. The display interface 302 may be configured to allow data to be transferred between the computer system 300 and external display 330. Exemplary display interfaces 302 may include high-definition multimedia interface (HDMI), digital visual interface (DVI), video graphics array (VGA), etc. The display 330 may be any suitable type of display for displaying data transmitted via the display interface 302 of the computer system 300, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 308 and secondary memory 310, which may be memory semiconductors (e.g., DRAMs, etc.). These computer program products may be means for providing software to the computer system 300. Computer programs (e.g., computer control logic) may be stored in the main memory 308 and/or the secondary memory 310. Computer programs may also be received via the communications interface 324. Such computer programs, when executed, may enable computer system 300 to implement the present methods as discussed herein. In particular, the computer programs, when executed, may enable processor device 304 to implement the methods illustrated by FIG. 2, as discussed herein. Accordingly, such computer programs may represent controllers of the computer system 300. Where the present disclosure is implemented using software, the software may be stored in a computer program product and loaded into the computer system 300 using the removable storage drive 314, interface 320, and hard disk drive 312, or communications interface 324.

The processor device 304 may comprise one or more modules or engines configured to perform the functions of the computer system 300. Each of the modules or engines may be implemented using hardware and, in some instances, may also utilize software, such as corresponding to program code and/or programs stored in the main memory 308 or secondary memory 310. In such instances, program code may be compiled by the processor device 304 (e.g., by a compiling module or engine) prior to execution by the hardware of the computer system 300. For example, the program code may be source code written in a programming language that is translated into a lower level language, such as assembly language or machine code, for execution by the processor device 304 and/or any additional hardware components of the computer system 300. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 300 to perform the functions disclosed herein. It will be apparent to persons having skill in the relevant art that such processes result in the computer system 300 being a specially configured computer system 300 uniquely programmed to perform the functions discussed above.

It is to be noted that the above described embodiments are not limited to a specific data-driven model 10 or task 20, only the ability of continuous, possibly real time, dynamic monitoring of the pluralities of variants 11-19 of the data-driven model 10 based on task performance in each of the deployment sites 1-3 being targeted.

In an illustrative embodiment, consider a global multi-modal transportation company operating through a plurality of national subsidiaries (sites 1-3), each one using its own delivery forecast solution.

In order to improve the performance of end-to-end transport operations (arrival/departure time delay, administrative delays), an ensemble of variants 11-19 (i.e. models) for shipping and rail providing time of arrival estimate and time of departure estimate timetables are created. The task 20 is here the optimization of freight operational costs (fuel consumption and/or travel time) in each of national subsidiaries (sites 1-3) of the multi-modal transportation company. Because these variants 11-19 require data from local/national sources, they are located in different data centers and their metrics/data/logs locally managed under a supervision module 31-33. The system 100 is therefore naturally distributed, the supervision modules 31-33 and variants 11-19 being located close to the input data 4-6 (on-site).

In the beginning, the following initial rules may be considered by the state manager 34-36:
- all existing variants 11-19 are online and used to perform usual business decisions;
- all new variants 11-19 are in quarantined state, for example, for 6 months;
- the output data 7-9 of all the worldwide variants 11-19 are collected daily by the remote server 40.

All the distributed supervision modules 31-33 consolidate their data into the remote server 40 where the different logistics experts and data scientists can gain insight into the pluralities of variants 11-19 performances.

To continuously monitor and benchmark the estimation performance of potential operations costs savings, the data and performance metrics (time of arrival/departure estimate vs. actual values) are provided to the remote server 40. Following the analysis of collected data and performance metrics (estimated time of arrival and estimated time of departure vs. actual values) on the remote server 40, consider the following notes:
- the average of immobilized days for most shipments is eight to ten days, mostly due to uncertainty in estimated time of arrival for shipment;
- simulations on historical data show this delay can be reduced to four-five for most of the routes, except five which are subject to high geo-political uncertainty (piracy, smuggling and ransom for example);
- concerning rail, the gap between the highest and lowest performing variants 11-19 is mainly due to administrative delays at customs;
- a finer analysis demonstrates that by adjusting delays in the internal planning table parameters, another 1-2 days can be saved for a selected subset of routes.

Based on these findings, the following strategy is deployed with new variants 11-19 and associated rules to be applied by the state manager 34-36 at the relevant sites 1-3:
- a new model for shipment estimated time of arrival is globally deployed in the quarantined state along the existing one. If the maximum gap between the new model and the actual route logs goes below five days for at least 80% of the shipments over a period of three months, then the model becomes online and the old one is quarantined;
- a new set of fine-tuned model parameters (adjusted for specific route interconnection delays) are deployed at relevant deployment sites 1-3 in a quarantined state. If after one month observation, the predicted time of arrival is at least 25% percent more accurate on a given route, the set is changed to the online state, along with the old one. A weighted estimate 60%-40% between the old and new model predictions will be used by the computing unit 37-39 to compute the final time of arrival estimation (task result 21-23) for this route to smooth the transition. This ratio might be revised every six months.

Moreover, as part of continuous monitoring of deployed variants 11-19, the performance of the pluralities of variants 11-19 and data are continuously collected, new variants 11-19 may be developed and/or already deployed variants 11-19 are refined. Over time, the following decisions can be made:
- the new shipment estimated time of arrival seems robust so the old variant is archived and then retired;
- the fine-tuned variants required more differentiation between routes than expected and did not always provide the expected long term robustness. A dedicated research program is launched using a new approach and additional data sources;
- the geopolitical situation has worsened and made some routes too risky. The associated variants 11-19 are archived and new ones are deployed according to a new global commercial strategy.

In a second illustrative embodiment, the sites 1-3 are a plurality of hospital sites equipped with a medical Computer Assisted Diagnosis (CAD) software application. The task 20 of this application is to provide a clinical insight given some radiology examinations. This task 20 is, for example, an intracranial hemorrhage detection (binary clinical outcomes or a health related score) based on data-driven model 10 such as a machine learning model (random forests, deep neural networks, or naïve Bayes for example), or a statistical model (a logistic regression, a penalized logistic regression for example). Input data 4-6 are provided by a medical imaging equipment (such as a digital Radiography, a magnetic resonance or an ultrasound imaging equipment), or by a medical image database system such as an archive image data in Picture Archiving and Communication System (PACS).

Because these applications are critical to the clinical workflow, but also susceptible to fail in presence of artifacts or other unidentified effects, a continuous local and global monitoring of the deployed applications is provided.

Thus, a supervision module 31-33 at each hospital site 1-3 is configured to continuously monitor the performance of the local application to mitigate the risk of decreasing performance. Moreover, the applications performance and anonymized data samples could be periodically sent to the remote server 40 for offline analysis. The acquired knowledge on the performance of the applications at the different sites 1-3 is used to define a global strategy of model updates/retirement. These decisions are remotely sent to the sites 1-3 and locally enforced by the supervision modules 31-33.

When certain sites 1-3 report sudden possible performance degradation, the remote server 40 (as a central platform) performs a detailed analysis of some specific samples sent by the complaining sites 1-3. Consider the two following possible actions:
- at one of the hospitals, the model performs as expected on a collection of images and indeed failed on some images. The only differences found is they all come from a recently installed modality;
- at the other hospital, while the failure rate is still low, there is no obvious reason for this slight performance decrease, except an increase in certain cases (for example, an older patient population);

To address the first point, an agreement to collect more data from this specific site/modality is used to build an augmented training and validation dataset and prepare for a new application's version deployment. The second point requires additional investigations and, if confirmed, will need a better inclusion of cases for this specific demographic (stratification by age) in the model training process. The current variant is left untouched until a new dataset combining the data from the new modality and additional cases is used to update the current model.

During an analysis and update phase, the new variant is locally tested and its performance validated. It is then deployed as a new version in the quarantined state, at the complaining sites, for a three month observation period, or after at least new one hundred cases are evaluated, whichever comes first. Because the applications are medical devices, the straight replacement of one application by another (or the same but with a different version) must be made after an observation period to ensure that the new one does not have unknown biases and performs equivalently to the former one. After this observation period, the new version seems to perform well and is set online in parallel with the former variant. The output of each application (probability of an hemorrhage) is averaged and a predefined threshold, as defined during the model sensitivity study, is used. The same set of strategies and rules is propagated to the other sites for the same observation period.

After the observation period, all the hospitals have both models online. However, during continuous monitoring and because of the different clinical patient patterns in the hospitals sites 1-3 (independent data shifts in the patient populations), finer analysis of the individual performance at each site shows a small but significant drop of performance of the new model at half the sites 1-3 (its output probability is consistently lower than the other model and the moving average is trending lower over time). The new model is put back into the quarantined state at a random selection of sites to mitigate a possible but unknown correlation effect, and a new investigation is launched. A new strategy may be then put in place and pushed to the different sites where the new variants are in the online state in hospitals where the specific modality is in use, and archived otherwise. In parallel, new model design with the expectation it will be more robust to both population stratification imbalances and modality make may be implemented.

Advantageously, the above-described embodiments allow
- to continuously evolve an ensemble of distributed models while maintaining their performance substantially equivalent and uncorrelated with introduced site-specific biases;
- to mitigate the risk of task performance drift;
- to dynamically track/follow-up biases in input-data 4-6 and adapt models accordingly;
- to ensure a proactive maintenance of an ensemble of distributed variants of a data-driven model to perform a predefined task subjected over time to unavoidable biased input data;
- rather than focusing on indefinitely increasing a given model performance, to anticipate this situation by replacing a model by another, in a progressive and controlled way;
- to ensure a long time performance of tasks at multiple sites without disruptions or loss of accuracy.

The ability of the data-driven model to dynamically evolve over time avoids some of the noted drawbacks of prior approaches. For instance, through the adaptive activation, quarantining, archiving and retirement of the variants, there is no longer a need to employ patches to address performance issues. As such, the efficiency of operation is not adversely impacted.

Furthermore, the likelihood that the performance of the data-driven model will plateau, and require a shift to a new paradigm, is significantly reduced. Hence, the system can continue to operate without the attendant loss of historical data that would otherwise result.

Advantageously, the above-described embodiments are privacy-preserving. In fact, while preserving the ability to evolve distributed models, no distributed training, which involves sharing training data, is required. In other words, the disclosed embodiments allow deployed variants of the data-driven model to evolve without having to share training data between deployment sites. Instead of a distributed learning, the deployed variants of the data-driven model may be locally or privately trained, then contribute to performance improvements in other deployment sites. If necessary, sharing a limited set of input data (possibly, anonymized) for analysis purposes is, of course, possible with the disclosed embodiments.

In addition, the above-described embodiments advantageously allow customized and scalable deployment of variants of the data-driven model according to each site's hardware resources. The number of variants being used in the online state and/or in the quarantined state in each site may be dynamically adapted (notably, in real time) according to the hardware resources available at the respective deployment site.

Further, the disclosed embodiments ensure task performance above a predefined lower limit corresponding to a confidence level, thus providing performance stability. Indeed, the use state of deployed variants of the data-driven model may be automatically changed in a proactive manner as soon the task performance falls below the predefined lower limit.

Advantageously, the above-described method for monitoring a distributed data-driven model is independent of the different possible designs or variants of the model (statistical models, machine learning models, ensemble models, supervised or not, parametric or not, linear or not, pre-trained or randomly initialized, customized or not). Rather, diversified variants of the data-driven model minimize the impact of the biases inherent in each variant and/or site-specific input data.

The invention claimed is:

1. A system for continuously monitoring a data-driven model configured to perform computer-assisted medical diagnostic tasks in a plurality of sites by generating, in each site of said plurality of sites, output data based on site-specific medical image input data, said system comprising:
at least one processing device in each site that is configured to implement:
a plurality of variants of the data-driven model deployed in a respective site of said plurality of sites, each variant of said plurality of variants being used in one of a plurality of states including a first state wherein the medical diagnostic output data of said each variant is included in computing a result of a task and a second state wherein the medical diagnostic output data of said each variant is excluded from computing the result of the task, and
a supervision module in a respective site of said plurality of sites for monitoring said plurality of variants deployed in said respective site, the supervision module being configured:

to compute the task result based on the medical diagnostic output data generated by at least two variants of said plurality of variants being used in the first state;

to monitor the performance of the variants used in the first state and in the second state in accordance with at least one rule to detect performance improvement or degradation, based on the medical diagnostic output data generated by the variants being used in the first state, and by the variants being used in the second state, and to change the use state of a variant from one state to another of said plurality of states based upon the performance monitoring, so as to retain or move to the first state those variants that meet a condition defined by said at least one rule.

2. The system of claim 1, wherein said at least one rule is based on historical performance over a predefined sliding window of each variant of said plurality of variants.

3. The system of claim 1, wherein the supervision module is further configured to apply the at least one rule to historical performance over a predefined sliding window of said plurality of variants being used in the first state and said plurality of variants being used in the second state to determine a state change of a variant.

4. The system of claim 1, wherein the supervision module is further configured to change the use state of a variant of said plurality of variants from one state to another of said plurality of states in response to a remote request.

5. The system of claim 1, wherein the task result is computed by majority vote between the output data generated by each variant of said plurality of variants being used in the first state.

6. The system of claim 1, wherein the task result is a weighted average of the output data generated by each variant of said plurality of variants being used in the first state.

7. The system of claim 1, wherein at least a same variant of the data-driven model is deployed in each site of said plurality of sites.

8. The system of claim 1, wherein the plurality of variants includes a machine learning model, and/or a statistical model and/or an ensemble model.

9. The system of claim 1, further including a remote server configured to collect from said supervision module information relating to said plurality of variants monitored by the supervision module.

10. The system of claim 9, wherein the remote server is configured to remotely change the use state of a variant of said plurality of variants from one state to another of said plurality of states.

11. The system of claim 9, wherein the remote server is configured to add a variant to said plurality of variants deployed in a site of said plurality of sites.

12. The system of claim 9, wherein the remote server is configured to compare a first historical performance collected from a first supervision module in a first site of said plurality of sites to a second historical performance collected from a second supervision module in a second site of said plurality of sites.

13. The system of claim 9, wherein the supervision module is configured to compute a task result using a computation method provided by the remote server.

14. The system of claim 9, wherein the remote server is configured to communicate update information to a first supervision module in a first site of said plurality of sites based on collected information from a second supervision module in a second site of said plurality of sites, the update information including tuning information of a variant or a state change of a variant.

15. A method for continuously monitoring a data-driven model configured to perform computer-assisted medical diagnostic tasks in a plurality of sites by generating, in each site of said plurality of sites, output data based on site-specific medical image input data, said method comprising:

deployment of a plurality of variants of the data-driven model in each site of said plurality of sites, each variant of said plurality of variants being used in one of a plurality of states including a first state wherein the medical diagnostic output data of said each variant is included in computing a result of a task and a second state wherein the medical diagnostic output data of said each variant is excluded from computing the result of the task;

monitoring said plurality of variants deployed in said each site, including computing the task result based on the medical diagnostic output data generated by at least two variants of said plurality of variants being used in the first state; and monitoring the performance of the variants used in the first state and in the second state in accordance with at least one rule to detect performance improvement or degradation, based on the medical diagnostic output data generated by the variants being used in the first state and by the variants being used in the second state, and changing the use state variant from one state to another of said plurality of states based upon the performance monitoring, so as to retain or move to the first state those variants that meet a condition defined by said at least one rule.

16. The method of claim 15, further including remote updating of a first variant deployed in a first site of said plurality of sites based on tracked performance of a second variant deployed in a second site of said plurality of sites.

* * * * *